United States Patent [19]

Neuwirth

[11] Patent Number: 4,911,661
[45] Date of Patent: Mar. 27, 1990

[54] HINGED COVER FOR TELEPHONE CONNECTOR BLOCKS

[75] Inventor: Helmuth Neuwirth, Garden City, N.Y.

[73] Assignee: Porta Systems Corp., Syosset, N.Y.

[21] Appl. No.: 338,154

[22] Filed: Apr. 14, 1989

[51] Int. Cl.[4] .............................................. H01R 9/22
[52] U.S. Cl. ................................. 439/718; 174/138 F
[58] Field of Search ............... 439/586, 595, 596, 718; 174/138 F

[56] References Cited

U.S. PATENT DOCUMENTS 4,194,801 3/1980 Fitzler et al. .................... 439/586 X
4,789,348 12/1988 Hampton ......................... 439/596 X

FOREIGN PATENT DOCUMENTS 2649390 4/1978 Fed. Rep. of Germany ...... 439/718

Primary Examiner—Neil Abrams
Assistant Examiner—Khiem Nguyen
Attorney, Agent, or Firm—Charles E. Temko

[57] ABSTRACT

A flexible synthetic resinous hinged cover for use in protecting the exposed face of a telephone connector block having connector terminals disposed in a recessed area in said face. The cover is flexible to form an inwardly extending V fold engageable within a corresponding slot or groove in the block to obtain a high degree of rigidity and prevent accidental dislodgment of the cover with respect to the block. The outer surface of the cover may be provided with delineated areas for inscribing circuit identifying notation.

3 Claims, 2 Drawing Sheets

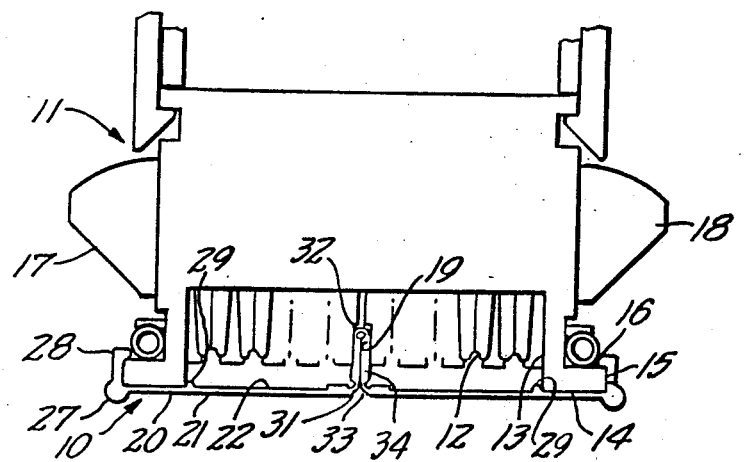
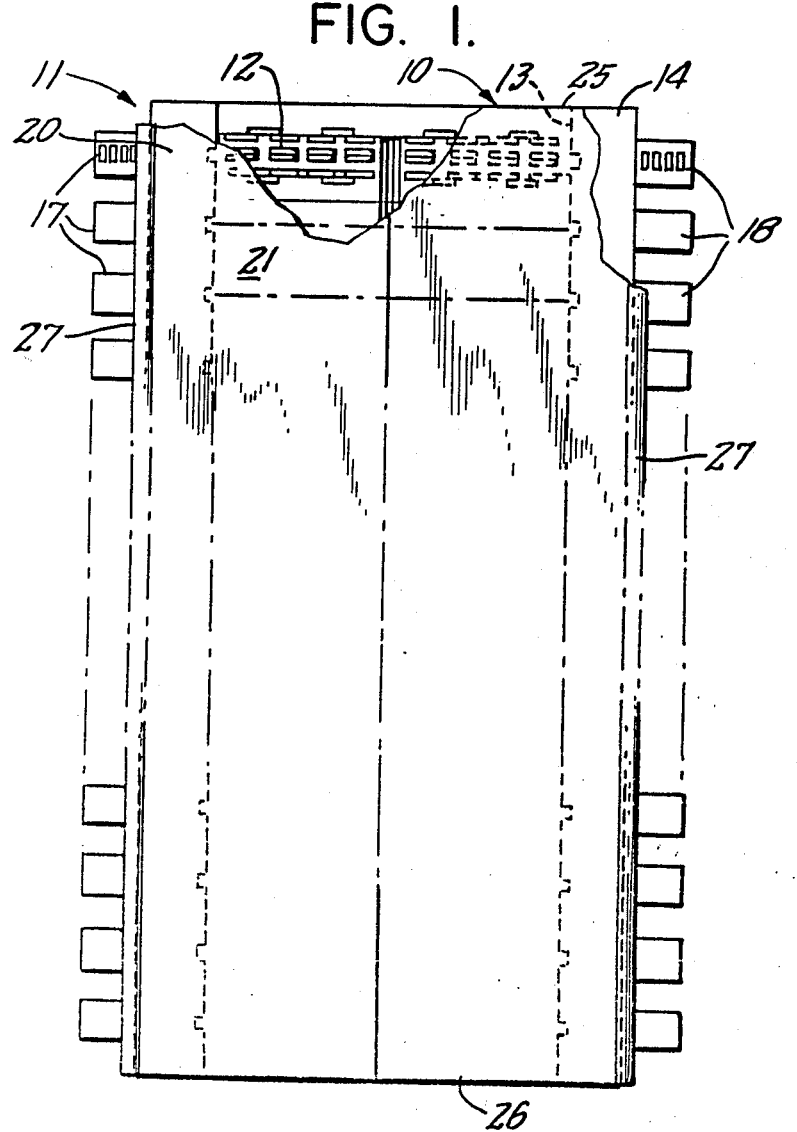

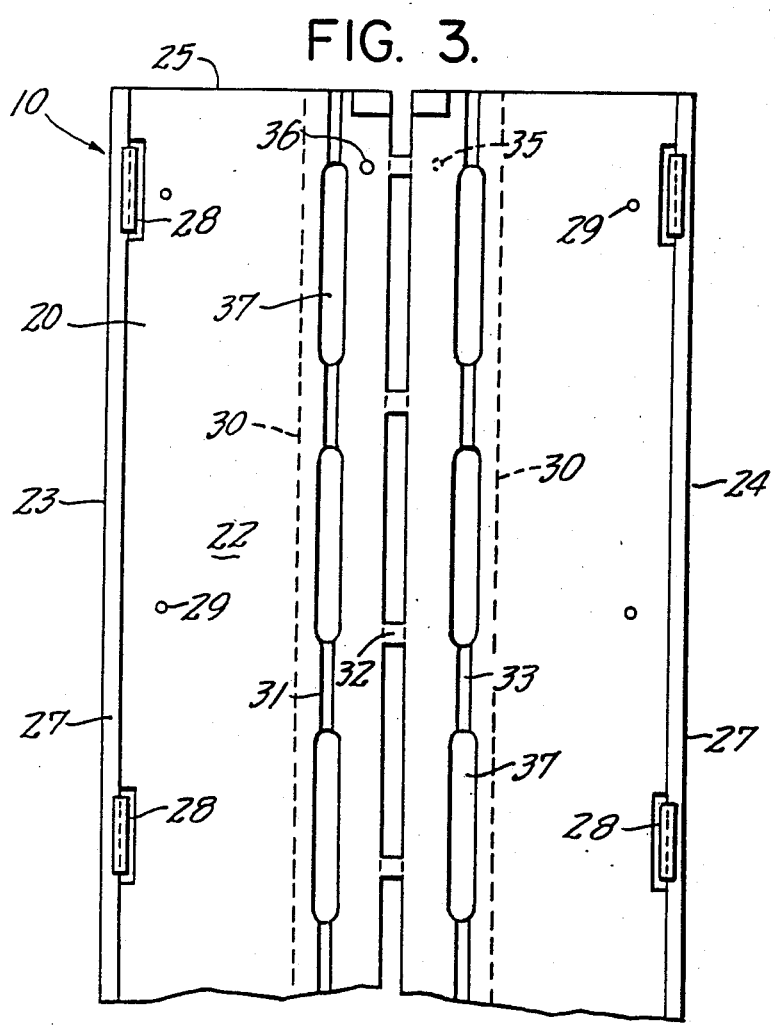
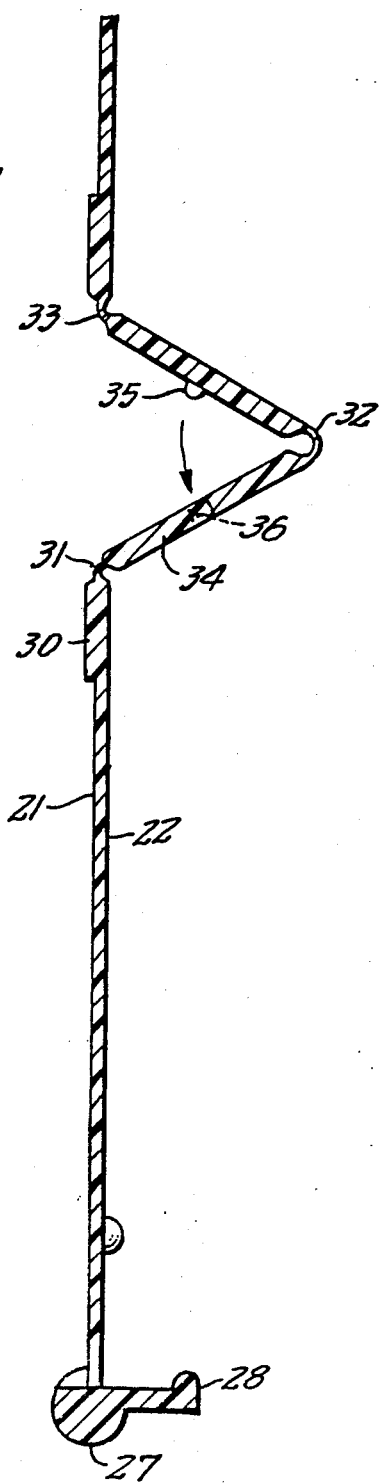
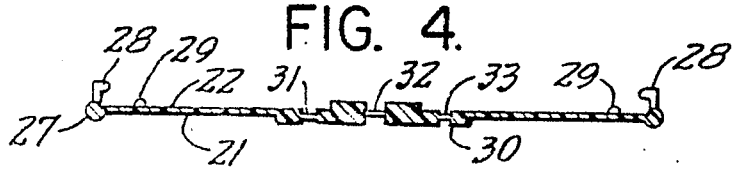

HINGED COVER FOR TELEPHONE CONNECTOR BLOCKS

BACKGROUND OF THE INVENTION

This invention relates generally to the field of telephony, and more particularly to an improved cover construction for use in protecting the exposed front surface of a telephone connector block of a contemporary type in which the front surface accesses plural insulation displacement contacts arranged in rank and file orientation.

In the interest of obtaining maximum possible circuit density, it is commonplace to employ connector blocks of a type in which a forward surface is provided with a recess within which insulation displacement contacts are accessed through wire guides communicating therewith. Blocks of this general construction are disclosed in U.S. Pat. No. 4,753,604, dated June 28, 1988 said patent being assigned to the same assignee as the present application. The recess in which the contacts are disposed is commonly provided with an elongated slot which accommodates a ground bar, the bar communicating with similar ground bars in aligned juxtaposed blocks mounted on a telephone main frame, the contacts ultimately leading to a source of ground potential. When the ground bar is used, individual subscriber circuit protection modules are engaged directly upon the exposed insulation displacement contacts, thus eliminating the need for providing separate protector module fields at an adjacent location.

In certain types of installations using this type of protector block, the modular protection of individual subscriber circuits is either unnecessary or provided at another location, in which case, the ground bar is not used. The insulation displacement contacts are thus left continuously exposed, and subject to the effects of dust, moisture, and possible inadvertent contact with electrically conductive sources. In such installations, it is desirable to provide some form of readily installed cover to shield the exposed contacts.

SUMMARY OF THE INVENTION

Briefly stated, the invention contemplates the provision of an improved light-weight synthetic resinous cover which is conveniently engaged and disengaged from the exposed front surface of such connector block to afford adequate protection to the insulation displacement contacts disposed immediately therebeneath. The cover is formed of material such as copolymer polypropylene, and is capable of forming a medially positioned V fold which engages the unused ground bar slot to impart not only retention of the cover, but increased rigidity as well, thereby permitting the cover to be formed with extremely thin sections and accommpanying savings in materials. The cover may be formed using simple molding techniques well-known in the art.

BRIEF DESCRIPTION OF THE DRAWINGS

In the drawings, to which reference will be made in the drawings, similar reference characters have been employed to designate corresponding parts throughout the several views.

FIG. 1 is a view in perspective of a known telephone protector block forming a part of the disclosed embodiment.

FIG. 2 is a top plan view of a cover element forming another part of the disclosed embodiment.

FIG. 3 is an end elevational view of the cover element as seen from the left-hand portion of FIG. 2.

FIG. 4 is an enlarged fragmentary view thereof corresponding to the upper portion of FIG. 3.

FIG. 5 is a cross-sectional view of the cover element in folded condition and engaged with a connector block.

FIG. 6 is a transverse sectional view showing the folding of the cover element prior to engagement with the protector block shown in FIG. 1.

DETAILED DESCRIPTION OF THE DISCLOSED EMBODIMENT

In accordance with the invention, the device, generally indicated by reference character 10, is used in association with a known telephone connector block 11 of generally rectangular configuration and mounting a plurality of insulation displacement contacts 12 disposed within a recess 13 in a forwardly facing front surface 14. Adjacent side surfaces, one of which is indicated by reference character 15, are provided with longitudinally extending grooves or recesses 16 adjacent optional wire guides 17 and 18. The block 11 also includes an elongated recess 19 of a type disclosed in U.S. patent application Ser. No. 199,057 filed Sept. 19, 1988 now U.S. Pat. No. 4,840,672 dated June 20, 1989, said application being assigned to the same assignee as the instant application. When the ground strip is used, the exposed contacts 12 will normally engage individual circuit protector modules (not shown) which have a ground connection with the ground strip. In such cases, the contacts 12 will be covered and protected by engagement with the protector modules. In many installations, however, individual circuit modular protection is not required, and, in such installations, the ground strip will not be used. It is in such installations that the contacts 12 and associated hard wiring are left fully exposed.

The device 10 comprises a generally planar main body 20 bounded by an outer surface 21, an inner surface 22, first and second side edges 23 and 24, respectively, as well as first and second end edges 25 and 26. The edges 23 and 24 are provided with a bead-like appendage 27 which improves rigidity, the appendage including integrally molded hook members 28 which are adapted to engage the grooves or recesses 16 when the cover is in mounted condition.

Disposed slightly inwardly of the edges 23-24 are hemispherically shaped beads 29 which serve a locating function with respect to the recess 13 when the cover is in installed condition. Further inwardly is a longitudinally extending medial section of increased thickness designated by reference character 30, which includes first, second and third fold areas 31, 32, and 33, respectively of relatively reduced thickness which permit the forming of a V fold 34 which engages the elongated recess or slot 19 (see FIG. 1). To facilitate accurate alignment, bores 35 are provided in one part of the V fold, and corresponding bores 36 are provided in an oppositely facing part which engage each other with the formation of the V fold.

In fully developed condition, the device 10 is somewhat wider than the width of the block, in order to provide additional material for the formation of the fold 34. Because of the rigidity provided by the appendages 27 and V fold 34, the remaining portions of the body 20 may be relatively thin, typically 0.030 inches. Flexibility of the fold lines 31–33, inclusive, may be improved by the provision of elongated cut out portions 37 which effectively shorten the axial length of the fold lines.

It may thus be seen that I have invented new and highly useful improvements in synthetic resinous covers for use with telephone connector blocks in those types of installations in which individual insulation displacement contacts accessed by the block are without any other form of shielding. The cover may be of unitary molded type, for the most part of relatively thin section, with rigidity being gained by the formation of a medially positioned fold adapted to engage an existing recess in the block, with the edges of the cover being held in position by hook-like members engaging recesses in side surfaces of the block. Removal of the cover, when desired, is simply a matter of disengaging the hook members from the recesses, and sliding the V fold from the longitudinal recess or slot in the block.

I wish it to be understood that I do not consider the invention to be limited to the precise details of structure shown and set forth in this specification, for obvious modifications will occur to those skilled in the art to which the invention pertains.

I claim:

1. An improved protective cover for use with a telephone protector block of a type having an exposed front surface supporting plural insulation displacement contacts within a recess in said front surface, said cover comprising, a molded main body of synthetic resinous material and of generally rectangular configuration bounded by inner and outer planar surfaces, first and second side edges, and first and second end edges; said side edges defining portions of increased thickness relative to said main body, and having hook-like laterally extending members forming means for engaging opposed side surfaces on said blocks; said main body defining a medially disposed area of increased thickness relative to the remaining portions thereof, said medially disposed area defining three parallel areas of reduced thickness forming predetermined fold lines; said medially disposed portion being foldable upon said fold lines to form a fold area of V-shaped cross-section extending laterally from the plane of said molded main body.

2. A protective cover in accordance with claim 1, further characterized in said fold area including corresponding mutually engageable projections and recesses for aligning said fold area.

3. In combination: a generally rectangular telephone connector block having an exposed front surface supporting plural insulation displacement terminals within a recess in said front surface, said recess defining a longitudinally oriented slot therein, and having recessed cover engaging means on opposed side surfaces bordering said front surface; and a protective cover engaging said connector block to overlie said front surface, said cover comprising: a molded main body of synthetic resinous material and of generally rectangular configuration bounded by inner and outer planar surfaces, first and second side edges, and first and second end edges; said side edges defining portions of increased thickness relative to said main body and having hook-like laterally extending members thereon engaging said cover engaging means; said main body defining a medially disposed area of increased thickness relative to the remaining portions of said main body, said medially disposed area defining three parallel areas of reduced thickness forming predetermined parallel fold lines; said medially disposed portion being folded upon said fold lines to form a folded area of V-shaped cross-section, said folded area being frictionally engaged within said longitudinally oriented slot in said recess in said front surface of said block to be retained therein.

* * * * *